(12) United States Patent
Redman (10) Patent No.: US 11,667,861 B2
(45) Date of Patent: Jun. 6, 2023

(54) EMULSIFIER AND EMULSIONS

(71) Applicant: SULNOX GROUP PLC, London (GB)

(72) Inventor: James Redman, London (GB)

(73) Assignee: SULNOX GROUP PLC, London (GB)

( * ) Notice: Subject to any disclaimer, the term of this patent is extended or adjusted under 35 U.S.C. 154(b) by 0 days.

(21) Appl. No.: 17/436,470

(22) PCT Filed: Mar. 5, 2020

(86) PCT No.: PCT/EP2020/055901
§ 371 (c)(1),
(2) Date: Sep. 3, 2021

(87) PCT Pub. No.: WO2020/182624
PCT Pub. Date: Sep. 17, 2020

(65) Prior Publication Data
US 2022/0002628 A1    Jan. 6, 2022

(30) Foreign Application Priority Data

Mar. 8, 2019 (GB) ..................... 1903169

(51) Int. Cl.
*C09K 23/00* (2022.01)
*C10L 1/32* (2006.01)
(Continued)

(52) U.S. Cl.
CPC .............. *C10L 1/328* (2013.01); *C09K 23/00* (2022.01); *C09K 23/018* (2022.01); *C10L 1/14* (2013.01);
(Continued)

(58) Field of Classification Search
CPC .......................... C09K 23/00; C10L 2250/086
See application file for complete search history.

(56) References Cited

U.S. PATENT DOCUMENTS

| | | | |
|---|---|---|---|
| 2003/0134755 A1 | 7/2003 | Martin | |
| 2003/0159339 A1* | 8/2003 | Rae | C10L 10/02 44/400 |
| 2005/0223628 A1* | 10/2005 | Mawdsley | C09K 23/017 44/412 |

FOREIGN PATENT DOCUMENTS

| | | | |
|---|---|---|---|
| GB | 2217229 A * | 10/1989 | ......... B01F 17/0085 |
| GB | 2217229 A | 10/1989 | |

(Continued)

OTHER PUBLICATIONS

Al-Sabagh et al "Formation of water-in-diesel oil nano-emulsions using high energy method and studying some of their surface active properties" Egyptian Journal of Petroleum (2011) 20, pp. 17-23.

(Continued)

*Primary Examiner* — Ellen M McAvoy
*Assistant Examiner* — Ming Cheung Po
(74) *Attorney, Agent, or Firm* — Young Basile Hanlon & MacFarlane, P.C.

(57) ABSTRACT

There is provided an emulsifier comprising at least one $C_8$ to $C_{18}$ fatty acid diethanolamide, at least one $C_{12}$ to $C_{24}$ fatty acid, at least one $C_6$ to $C_{18}$ alcohol ethoxylate and optionally at least one sorbitan ester and/or at least one alkylene glycol monoalkyl ether. There is additionally provided emulsions comprising a fuel, water and an emulsifier and methods of producing emulsions.

9 Claims, 3 Drawing Sheets

(51) Int. Cl.
*C10L 1/14* (2006.01)
*C10L 10/02* (2006.01)
*C10L 1/183* (2006.01)
*C10L 1/185* (2006.01)
*C10L 1/188* (2006.01)
*C10L 1/19* (2006.01)
*C10L 1/224* (2006.01)

(52) U.S. Cl.
CPC .............. *C10L 10/02* (2013.01); *C10L 1/1832* (2013.01); *C10L 1/1852* (2013.01); *C10L 1/1881* (2013.01); *C10L 1/19* (2013.01); *C10L 1/224* (2013.01); *C10L 2200/0446* (2013.01); *C10L 2200/0476* (2013.01); *C10L 2250/084* (2013.01); *C10L 2250/086* (2013.01); *C10L 2270/026* (2013.01); *C10L 2290/34* (2013.01)

(56) References Cited

FOREIGN PATENT DOCUMENTS

| WO | 0110982 | A1 | 2/2001 | | |
|---|---|---|---|---|---|
| WO | WO-0110982 | A1 * | 2/2001 | ................ | C10L 1/02 |
| WO | 0162877 | A1 | 8/2001 | | |
| WO | 02090469 | A1 | 11/2002 | | |
| WO | 03075954 | A1 | 9/2003 | | |
| WO | 2013098630 | A1 | 7/2013 | | |
| WO | WO-2013098630 | A1 * | 7/2013 | .............. | C10L 1/328 |

OTHER PUBLICATIONS

Hielscher, "Ultrasonic Production of Nano-Size Dispersions and Emulsions," ENS'05, Dec. 14-16, 2005.
International Search Report and Written Opinion Received for PCT Patent Application No. PCT/EP2020/055901, dated Sep. 17, 2020.
Lif, A., "Water-in-diesel emulsions and related systems", Advances in Colloid and Interface Science, 123-126 (2006), pp. 231-239.
Uchoa et al, "Evaluation of Lubricating Properties of Diesel Based Fuels Micro Emulsified With Glycerin", Materials Research, 2017, 20(Suppl. 2), pp. 701-708.
UKIPO Search Report received for Application GB1903169.9, dated Sep. 11, 2019, 4 pages.
Search Report and Written Opinion issued in co-pending Singapore Application 11202109395U dated Dec. 1, 2022 (8 pages).

* cited by examiner

EMULSIFIER AND EMULSIONS

This application is a 371 application of International Application No. PCT/EP 2020/055901 filed on Mar. 5, 2020, which claims priority to United Kingdom Patent Application No. 1903169.9 filed Mar. 8, 2019, the entire disclosures of which are hereby incorporated by reference.

This invention relates to compositions suitable for use as emulsifiers or scavengers and to diesel formulations or emulsions containing the compositions.

Diesel engines are very efficient engines. However, the use of diesel fuel presents a number of difficulties. In particular, diesel engines produce a significant amount of regulated pollutants, including particulate matter, NOx, SOx and CO.

It is known that water-emulsified diesel can improve the physical or chemical properties of the diesel and reduce some of the pollutant emissions. Lif and Holmberg "Water-in-diesel emulsions and related systems", Advances in Colloid and Interface Science, 123-126 (2006), pp 231-239 provides background of the use of water-emulsified diesel and other related fuels.

However, in order to obtain the benefits of the water-emulsified diesel, it is important that the resulting emulsion is stable. Diesel engines are used in a wide variety of different conditions. Therefore, the emulsion needs to be stable across an extremely broad temperature range (such as −20 to 70° C.). Al-Sabagh et al "Formation of water-in-diesel oil nano-emulsions using high energy method and studying some of their surface active properties" Egyptian Journal of Petroleum (2011) 20, pp 17-23 discusses the use of ultrasound to prepare stable emulsions using Span 80, Emarol 85 and their mixture as emulsifiers. WO2013/098630 discloses diesel oil and water emulsions and discusses the importance of stability of at least 3 months under normal storage conditions and at temperatures between −20 and +50° C. However, there is no evidence of an improved stability. WO03/075954 discloses and emulsifying composition comprising an ethoxylated alkylphenol, a fatty acid amine, oleic acid and naphtha.

It is usual to include an emulsifier in the water-diesel emulsion. However, typical emulsions still do not have sufficient stability.

It would be desirable to introduce a composition which could provide stable micro- or nano-emulsions.

Diesel fuels typically contains large amounts of sulphur, which results in the production of SOx. There is a move to reduce the amount of sulphur present in diesel. However, reducing the amount of sulphur also reduces the lubricity of the diesel, which causes problems in the engine, as discussed in Uchoa et al, "Evaluation of Lubricating Properties of Diesel Based Fuels Micro Emulsified With Glycerin", Materials Research, 2017, 20(Suppl. 2), pp 701-708. This is commonly remedied by including bio-ingredients into the diesel fuel. However, the inclusion of these bio-ingredients can cause problems with the formation of stable nano-emulsions.

Therefore, it would be desirable to provide a diesel fuel composition which had good lubricity whilst at the same time providing stable nano-emulsions.

Compositions which are capable of forming stable nano-emulsions in standard diesel are not typically capable of forming stable nano-emulsions in ultra low sulphur diesel with bio-ingredients and vice versa.

It would be desirable to provide a composition which can be added to either type of diesel or to heavy fuel oil and provide various benefits including reduced emissions without the need to add additional water.

It would be further advantageous to provide a composition which can be tailored easily to produce stable nano-emulsions in diesel fuels containing different amounts of sulphur and different amounts of bio-components.

It would be advantageous to provide compositions which can be tailored to improve different properties of the emulsions, including lubricity, droplet size, corrosion resistance and specific gaseous and particulate emissions.

It would be additionally advantageous to provide a composition which is capable of producing a stable nano-emulsion at low levels of power input and/or very quickly.

For the purposes of the present invention, reference to diesel or diesel fuel is intended to cover petroleum diesel, low-sulphur diesel, biodiesel and combinations thereof.

For the purposes of the present invention, reference to petroleum diesel relates to diesel produced during the distillation of crude oil.

For the purposes of the present invention, reference to heavy fuel oil relates to oil produced during the distillation of crude oil and having a density greater than 900 kg/m$^3$ at 15° C.

For the purposes of the present invention, reference to low-sulphur diesel relates to diesel having less than 500 ppm, preferably less than 50 ppm, and most preferably less than 10 ppm sulphur. Low-sulphur diesel can be produced by removing the sulphur from petroleum diesel, by the formation of synthetic diesel or by the formation of biodiesel.

For the purposes of the present invention, reference to biodiesel relates to fatty acid methyl ester obtained by transesterification of vegetable oils or animal fats with an alcohol, typically methanol or ethanol.

For the purposes of the present invention, reference to bio-components relates to biodiesel and naturally occurring oils, such as palm oil, rapeseed oil and coconut oil.

In a first aspect of the present invention, there is provided an emulsifier which is capable of forming a stable emulsion with diesel or heavy fuel oil. The emulsifier comprises:
  a. at least one $C_8$ to $C_{18}$ fatty acid diethanolamide;
  b. at least one $C_{12}$ to $C_{24}$ fatty acid; and
  c. at least one $C_6$ to $C_{18}$ alcohol ethoxylate.

Preferably, the emulsifier does not comprise or contain naphtha. Preferably, the emulsifier consists essentially of components (a), (b) and (c).

The emulsifier is suitable to be used to form an emulsion with diesel, low sulphur diesel, biodiesel or heavy fuel oil. The emulsion can comprise up to 30 wt % water. The emulsion comprises at least 0.5 wt % emulsifier. Higher levels of emulsifier can be used up to 15 wt %. However, increasing the amount of emulsifier increases the cost with no identifiable improvement in stability. Therefore, a preferred upper limit for the amount of emulsifier is 3 wt %. It is preferred that the emulsion contains only the fuel, water and the emulsifier.

It is preferred that the fatty acid diethanolamide is a formed from a mixture of fatty acids having from 8 to 18 carbon atoms. It is particularly preferred that the fatty acid diethanolamide is derived from a natural source. Suitable natural sources include coconut oil and palm oil. By way of example, coconut oil is a mixture of acids including caprylic, capric, lauric, myristic, palmitic, stearic, oleic and linoleic acids.

One feature of components used in emulsifiers is the HLB. HLB values can either be calculated or determined experimentally. The standard methods of calculation include those of Griffin (Journal of the Society of Cosmetic Chemists 5 (1654): 259) or Davies (Gas/Liquid and Liquid/Liquid interface: Proceedings of the International Congress of the Surface Activity (1657). However, it is preferred that the HLB values are obtained experimentally. It is usual for suppliers of materials to provide HLB values for their products which are obtained experimentally. The skilled person is aware of suitable methods to determine the HLB value, such as using comparative testing by forming a series of emulsions with an emulsifier and an oil of known HLB value. In general, a HLB in the range of 3.5 to 6 is commonly used for water in oil emulsions. A HLB in the range of 8 to 18 is used for oil in water emulsions.

Coconut oil diethanolamide typically has a HLB in the range of 13-14. Whilst it is not essential that the diethanolamide has an HLB in this range, it is preferred that the diethanolamide has an HLB in the range of 11-16 and preferably 13-14.

Fatty acid diethanolamides based on fatty acids with fewer than 8 carbon atoms or more than 18 carbon atoms can optionally be present in the mixture, although it is preferred that they are not.

It is preferred that the fatty acid diethanolamide is present in an amount of from 40 to 90 wt % of the emulsifier. It is more preferred that it is present in an amount of from 50 to 90 wt % and more preferably from 60 to 85 wt %.

The at least one $C_{12}$ to $C_{24}$ fatty acid is preferably saturated or monounsaturated, with monounsaturated fatty acids being further preferred. The fatty acid is preferably a $C_{14-20}$ monounsaturated fatty acid. A particularly suitable fatty acid is oleic acid.

Oleic acid has a HLB of approximately 1. A low HLB means that it is highly lipophilic and therefore a material of this lipophilicity is not typically used as an emulsifier. It is preferred that the fatty acid has a low HLB, preferably below 3.5 and more preferably below 2.

The fatty acids are preferably present in an amount of from 1 to 15 wt %, more preferably from 2 to 10 wt % and most preferably from 4 to 7 wt % of the emulsifier.

The $C_6$ to $C_{18}$ alcohol ethoxylate is preferably produced from at least one alcohol and more preferably at least one mono-ol. The ethoxylates preferably have from 2 to 8 ethoxy-groups. Preferred ethoxylates include nonylphenol ethoxylate and $C_9$-$C_{12}$ ethoxylates. Suitable ethoxylates are commercially available. Suitable ethoxylates include Berol 260 and Ethylan 1005, which are narrow range ethoxylated alcohols commercially available from AkzoNobel.

Nonylphenol ethoxylates have a range of HLB values depending on the number of ethylene oxide groups present. Preferred nonylphenol ethoxylate have from 4 to 8 ethylene oxide groups, which have an HLB of approximately from 9 to 12. A particularly preferred nonylphenol ethoxylate has 6 ethylene oxide groups and a HLB of approximately 11.

Berol 260 has a HLB value of 10.5 and is a narrow range $C_9$-11 alcohol with 4 ethylene oxide groups. Ethylan 1005 has a HLB value of 11.6 and is a narrow range $C_{10}$ alcohol with 3.5 ethylene oxide groups.

It is preferred that the alcohol ethoxylate has a HLB value in the range of 9 to 12 and preferably from 10 to 12.

The alcohol ethoxylate is preferably present in an amount of from 5 to 30 wt % of the emulsifier. It is further preferred that the alcohol ethoxylate is present in an amount of from 5 to 20 wt % and more preferably from 8 to 12 wt %.

The emulsifier can optionally comprise a sorbitan ester as defined below. The sorbitan ester, where present, is used in an amount of from 10 to 40 wt % of the emulsifier, preferably from 20 to 30 wt %.

In a second aspect of the present invention, there is provided an emulsifier which is suitable for forming a stable nano-emulsion of diesel and water, wherein the diesel does not contain any bio-components.

The emulsifier comprises:
a. 60-90 wt % of at least one $C_8$ to $C_{18}$ fatty acid diethanolamide;
b. 2-10 wt % of at least one $C_{12}$ to $C_{24}$ fatty acid; and
c. 5-20 wt % of at least one $C_6$ to $C_{18}$ alcohol ethoxylate.

Preferred components a to c are as defined above.

Preferably, the emulsifier does not comprise naphtha. Preferably, the emulsifier consists essentially of components (a), (b) and (c).

The nano-emulsion comprises a fuel comprising at least one of petroleum diesel, low sulphur diesel and heavy fuel oil, wherein the fuel does not contain any bio-components, wherein the fuel does not contain any bio-components, up to 20 wt % water and the emulsifier, wherein the emulsifier: water volume ratio is from 1.5:1 to 1:2.9, and preferably 1.2:1 to 1:2. It is preferred that the water is present in an amount of at least 0.25 wt % and more preferably at least 0.5 wt %. It is preferred that the nano-emulsion contains only the fuel, water and emulsifier. Although other components can be present, it is preferred that these are only present in trace amounts of less than 0.1 wt %.

In a preferred embodiment, the emulsifier of the second aspect comprises 80-90 wt % of component a, 4-8 wt % of component b and 5-15 wt % of component c.

In a third aspect of the present invention, there is provided an emulsifier which is suitable for forming a stable nano-emulsion of diesel and water, wherein the diesel contains bio-components.

The emulsifier comprises:
a. 50-75 wt % of at least one $C_8$ to $C_{18}$ fatty acid diethanolamide;
b. 2-10 wt % of at least one $C_{12}$ to $C_{24}$ fatty acid;
c. 5-20 wt % of at least one $C_6$ to $C_{18}$ alcohol ethoxylate; and
d. 10-40 wt % of at least one sorbitan ester.

Preferably, the emulsifier does not comprise or contain naphtha. Preferably, the emulsifier consists essentially of components (a), (b), (c) and (d).

The nano-emulsion comprises a fuel comprising at least one of diesel, low sulphur diesel, biodiesel and heavy fuel oil, wherein the fuel comprises bio-components, up to 20 wt % water and the emulsifier of the third aspect. The emulsifier:water volume ratio is from 1.5:1 to 1:2.9, and preferably 1.2:1 to 1:2. It is preferred that the nano-emulsion contains only the fuel, water and emulsifier. Although other components can be present, it is preferred that these are only present in trace amounts of less than 0.1 wt %.

Preferred components a to c are as defined above.

The sorbitan ester is the reaction product of sorbitan and one or more carboxylic acids. Preferably, the carboxylic acids have from 8 to 22 carbon atoms. Preferably the carboxylic acids have from 8 to 22 carbon atoms, which is the length of carbon chains found in naturally occurring fatty acids in triglycerides. Particularly preferred are carboxylic acids having from 16 to 22 carbon atoms and even more preferably having 18 carbon atoms. The fatty acids can be both linear and branched.

Both saturated and unsaturated fatty acids are suitable. However, unsaturated fatty acids are preferred.

Some sorbitan esters which are suitable for use in the present invention include:

| Ester | HLB |
| --- | --- |
| Sorbitan tristearate | 2.1 |
| Sorbitan monooleate | 4.3 |
| Sorbitan isostearate | 4.7 |
| Sorbitan trioleate | 1.8 |
| Sorbitan sesquioleate | 3.7 |

Suitable sorbitan esters have an HLB of less than 6.0. Preferred sorbitan esters are those having an HLB of from 3 to 5. Particularly preferred is sorbitan monooleate.

In a preferred embodiment, the emulsifier of the second aspect comprises 55-65 wt % of component a, 4-8 wt % of component b, 5-15 wt % of component c and 20 to 30 wt % of component d.

In a fourth aspect, there is provided a scavenger solution. The scavenger solution is capable of being added to diesel or heavy fuel oil. The scavenger solution is capable of emulsifying any residual water in the diesel as well as improving the lubricity of the diesel. By removal of residual water, the scavenger is capable of providing other benefits including preventing diesel bug. In one embodiment, the scavenger solution comprises:

a. 10-25 wt % of at least one $C_8$ to $C_{18}$ fatty acid diethanolamide;
b. 0.2-3 wt % of at least one $C_{12}$ to $C_{24}$ fatty acid;
c. 1-4 wt % of at least one $C_6$ to $C_{18}$ alcohol ethoxylate; and
d. 60-90 wt % alkylene glycol monoalkyl ether.

Preferably, the scavenger solution does not comprise or contain naphtha Preferably, the scavenger solution consists essentially of components (a), (b), (c) and (d).

In a second embodiment, the scavenger solution comprises from 10 to 40 wt % of the emulsifier of any one of the first to third aspects of the present invention and from 60 to 90 wt % alkylene glycol monoalkyl ether.

A fuel formulation is formed of a fuel comprising at least one of diesel, low sulphur diesel, biodiesel and heavy fuel oil and the scavenger solution in an amount of 0.03 to 0.2% by volume and preferably 0.03 to 0.075% by volume. The inclusion of the scavenger in the above amounts is capable of treating a fuel with up to 5 wt % of residual water. However, it is preferred that the water contains less than 2.5 wt % and more preferably less than 1 wt % water.

It is preferred that the fuel formulation contains only the fuel, water and emulsifier. Although other components can be present, it is preferred that these are only present in trace amounts of less than 0.1 wt %.

Preferred components a to c are as defined above.

The alkylene glycol monoalkyl ether is preferably an ethylene glycol monoalkyl ether and more preferably an ethylene glycol monoalkyl ether in which the alkyl group has from 1 to 6 carbon atoms. More preferably, the ether is preferably 2-butoxyethanol (butyl oxitol).

The alkylene glycol monoalkyl ether is preferably used in an amount of 70 to 90% by weight and more preferably from 75 to 85% by weight.

The emulsifiers of the present invention advantageously permit emulsions of diesel and heavy fuel oils to be formed easily with low levels of emulsification energy. The resulting emulsions produced are stable for long periods of time. The emulsions also provide the advantageous properties of water in diesel emulsions by reducing the amount of emissions and particulates produced. These emulsifiers, which can be produced using naturally occurring materials, are therefore beneficial as they are environmentally beneficial as they do not typically contain components which are harmful to produce whilst at the same time reducing emissions in the engines in which they are used.

Emulsions can be formed irrespective of the order of the addition. It is possible to add the emulsifier to the diesel or heavy fuel oil and then add water, to add the emulsifier to a mixture of diesel or heavy fuel oil and water or to add a mixture of emulsifier and water to the diesel or heavy fuel oil.

In a further aspect of the present invention, there is provided a mixture of an emulsifier according to any one of the above aspects of the present invention and water. The mixture comprises water and emulsifier in the relative amounts described above in the absence of the diesel or heavy fuel oil.

In a fifth aspect, there is provided a method of making a nano-emulsion comprising emulsifying a mixture of fuel, water and an emulsifier of the second, third or fourth embodiments using ultrasonic emulsification.

The use of ultrasonic emulsification to produce nano-size emulsions is known to the skilled person and is described for example in Hielscher, "Ultrasonic Production of Nano-Size Dispersions and Emulsions, ENS'05, 14-16 Dec. 2005.

One benefit of forming a nano-emulsion using ultrasonic emulsification is the speed at which the emulsions can be produced. The emulsions can be formed in seconds rather than minutes.

In addition, nano-emulsions of water in diesel have been shown to be effective for use in diesel engines at reducing the level of toxic emissions.

However, improved properties are only beneficial if the resulting nano-emulsions are stable for long periods of time and at varying temperatures. Stability of the emulsions is important as a change in properties of a fuel is problematic as it will have a great impact on the levels of emissions produced.

The emulsions of the present invention are not only highly stable, but the nano-emulsions can be produced using surprisingly low levels of energy, which is commercially and environmentally advantageous.

Whilst the scavenger solution of the fourth aspect can be used to produce nano-emulsions, it is preferred that the emulsion is produced by simple addition of the scavenger solution to the fuel. The emulsions can be formed by simple mixing of the scavenger solution and fuel. In one preferred embodiment, the emulsion can form in situ as the fuel passes through the fuel pump.

The emulsifier or scavenger compositions of any of the first to fourth aspects can optionally contain other components. The inclusion of the components is generally known to the skilled person and they are used in their usual amounts.

Metal oxides are known to be useful for reducing SOx and NOx. Where used, these are typically present in the compositions in amounts of from 5 to 100 ppm. Suitable metal oxides include cerium oxide, magnesium oxide, titanium oxide, iron oxide and aluminium oxide. Magnesium oxide is typically used in heavy fuel oils and cerium oxide is typically used in diesel.

Ferrocene is also known to the skilled person to be useful for promoting smokeless combustion of fuels.

Lower ($C_{1-5}$) alcohols are commonly used to reduce soot and also to reduce the freezing point of the diesel or heavy fuel oil composition. Preferred alcohols include methanol, ethanol, i-propanol and n-propanol. These are used in an amount of less than 5% by weight and more preferably less than 2% by weight.

Stability of the emulsions is important. A simple emulsion of water and diesel will slowly separate. The inclusion of emulsifiers is therefore intended to improve the stability. One measure of the stability of the emulsion is the droplet size. This can be measured by looking at the turbidity, which can be measured using a Turbimeter, such as a Van Walt Compact Turbimeter. Therefore, turbidity can be used as a means of studying the stability of an emulsion.

In addition, the turbidity can be used to assess how effective an emulsifier is at forming an emulsion i.e. the relative ability of an amount of emulsifier to form an emulsion. The smaller the particle size for a specific amount of emulsifier, the more effective that emulsifier is.

Measurement of turbidity is a quick method to establish the effectiveness of an emulsifier.

The invention will be further described with reference to the following Figures.

Sorbitan monooleate (SPAN 80) by CRODA®

Berol 260 ($C_{9-11}$ alcohol ethoxylate) (B260) by AkzoNobel®

Ethylan 1005 SA ($C_{10}$ alcohol ethoxylate) (E1005) by AkzoNobel®

The emulsifiers used the following parts by weight.

TABLE 1

| Composition | CDE | OA | NP-6D | NP-6G | SPAN 80 |
|---|---|---|---|---|---|
| 1* | 30 | | | 20 | 50 |
| 2* | 45 | | | 27 | 28 |
| 3* | 65 | | 10 | | 25 |
| 4* | 75 | | | 12 | 13 |
| 5 | 65 | 25 | 10 | | |
| 6 | 80 | 10 | 10 | | |
| 7 | 85 | 5 | 10 | | |
| 8 | 62.5 | 10.5 | 8 | | 19 |
| 9 | 62 | 5 | 10 | | 23 |
| 10 | 65 | 5 | 10 | | 20 |

*indicates an example not within the scope of the claims 3 parts by weight of emulsifier were mixed with 89 parts by weight of diesel and water in the amounts set out in Table 2. The emulsions were formed using the specified mixer and the turbidity measured.

TABLE 2

| | Composition | | | | | | | | | | |
|---|---|---|---|---|---|---|---|---|---|---|---|
| | 1* | 2* | 3* | 3* | 4* | 5 | 6 | 7 | 8 | 9 | 10 |
| Diesel | Local | Local | Local | Shell V-Power | Local | Shell V-Power | Shell V-Power | Shell V-Power | Shell 50 | Shell 50 | Shell 50 |
| Mixer | SC | SC | SC | U1000 | SC | U1000 | U1000 | U1000 | U400 | U400 | U400 |
| Turbidity @0 parts $H_2O$ | | | 0.74 | | | | 0.01 | 0.01 | 0.01 | 0.01 | |
| @1 part $H_2O$ | | | 0.42 | 0.82 | >1050 | 4.15 | 4.54 | 4.28 | 0.01 | 1.82 | 2.09 |
| @2 parts $H_2O$ | | 11.1 | 7.95 | 4.11 | | 27.50 | 23.10 | 30.20 | 13.6 | 8.3 | 35.1 |
| @3 parts $H_2O$ | | 30.5 | 28.1 | 20.6 | | 29.6 | 50.80 | 46.60 | 19.1 | 17.5 | 27.9 |
| @4 parts $H_2O$ | | 50.0 | 51.2 | 41 | | 42.8 | 50.5 | 50.6 | 24.7 | 51.2 | 43.7 |
| @5 parts $H_2O$ | | 50.9 | 51.3 | 700.0 | | 50.5 | 50.6 | 50.7 | 38.8 | 855 | 50.7 |
| @6 part $H_2O$ | | 58.5 | 51.5 | 0.74 | | 50.6 | 50.6 | 45.6 | 72.4 | >1050 | 405 |
| @7 parts $H_2O$ | | 90.5 | 58.6 | | | 67 | 68.4 | 55.3 | 412 | >1050 | 429 |
| @8 parts $H_2O$ | >1050 | 145 | 100 | | | 134 | 76.8 | 76.8 | 351 | 329 | 682 |
| @12 parts $H_2O$ | | | 200 | | | | | | | | |
| @15 parts $H_2O$ | | | 320 | | | | | | | | |

*indicates an example not within the scope of the claims

The invention will be further described with reference to the following Examples.

EXAMPLES

Example 1

A number of compositions were produced and tested for producing emulsions with varying amounts of water. Each composition was produced by mixing the emulsifier, blending the emulsifier with diesel and then adding water and emulsifying.

The emulsifiers were made using the following ingredients:

Coconut fatty acid diethanolamide (CDE) from by SABO®

Oleic acid (OE) from Eastman Chemical Company

Tergitol® NP-6 (nonylphenol polyethoxylate) (NP-6D) by The Dow Chemical Company

Nonylphenol polyethoxylate (NP-6G) by Gamma Chemical

SC is a Heidolph Silent Crusher variable speed high shear mixer.

U1000 is a Hielscher UIP1000 bench top ultrasonicator.

U400 is a Hielscher UP400st lab ultrasonicator.

Both "local" diesel and Shell V-Power are both diesel fuels that do not contain bio components.

Shell 50 is Shell V Power 50 ppm diesel which has less than 50 ppm sulphur and contains bio-components.

Turbidity was measured immediately after the formation of the emulsion using the Van Walt Compact Turbimeter.

The results demonstrate that the compositions of the present invention are capable of forming stable emulsions with low turbidity across a broad range of water content using low levels of the compositions. The compositions are also capable of forming stable emulsions even when the fuel is a low sulphur fuel.

Example 2

Compositions were tested to measure the stability of emulsions of water and diesel containing biocomponents at higher levels of water.

Composition 10 was mixed with water at a ratio of 33 parts composition to 67 parts by weight water. The mixture of water and composition were then added to Shell 50 in the amounts set out in Table 3. The mixing was undertaken at ambient temperature. The diesel/water mixture was emulsified using a U400 ultrasonicator for 1 minute. The samples were then allowed to cook to ambient temperature and transferred to a container for long term storage. The container was stored at ambient temperature at an altitude of 550 m. The ambient temperature varied from 0° C. to 37° C.

The turbidity was measured immediately after emulsification and again after a few minutes once air bubbles had cleared.

TABLE 3

| Shell 50 (pbw) | Water/Example 10 (pbw) | Turbidity @0 mins | Turbidity @2-5 mins |
|---|---|---|---|
| 90 | 10 | 60.5 | 50.3 |
| 85 | 15 | 71.3 | 50.4 |
| 80 | 20 | 155 | 50.5 |

Figure 1A:
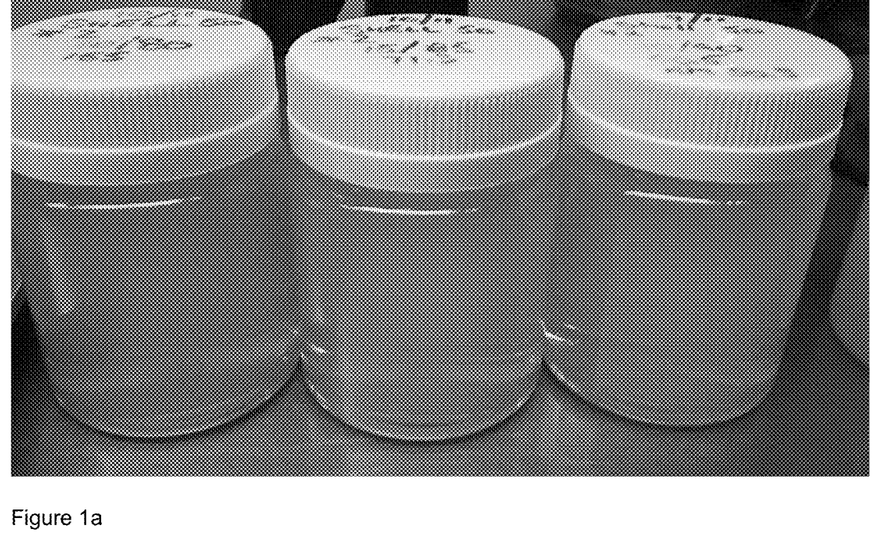
FIG. 1 shows the stability of diesel emulsions over a year.
Figure 1B:
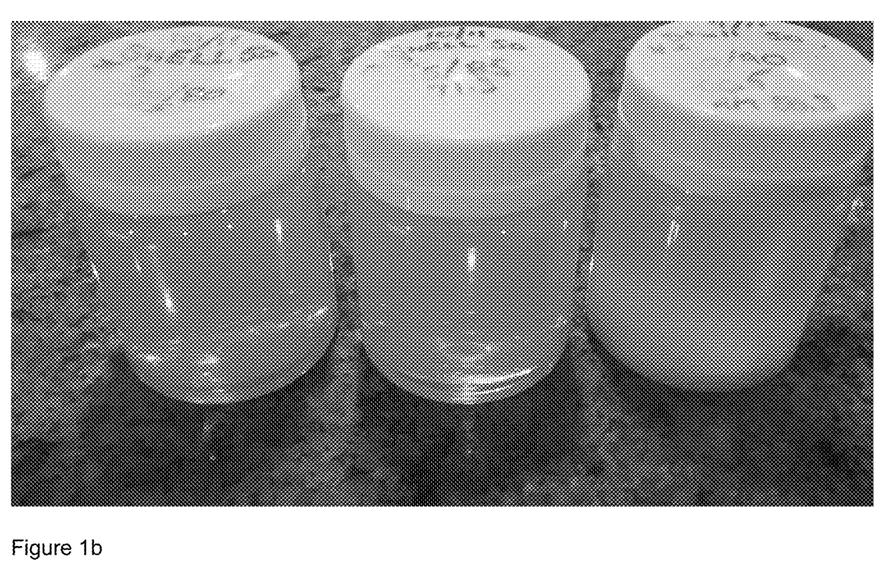

The emulsions were stored for a period of greater than a year. It should be noted that storage of modern fuels for more than 6 months is not recommended. All three emulsions were stable for a year. After 15 months, the emulsion containing 10 pbw water/emulsifier had separated slightly. This was the time when the first signs of separation had started to show. 15 months is an extremely long period of stability. This is shown in FIG. 1, in which a) shows the emulsions at formation (water/emulsifier content from left to right 20, 15, 10) and b) shows the emulsions after 15 months (same order) in which the emulsion for 10 pbw water is more turbid.

5 parts by weight of Example 10 was mixed with 85 parts by weight of diesel and 10 parts by weight of water. The diesel/water/emulsifier mixture was emulsified using a U400 ultrasonicator for 1 minute. The samples were placed in a heated oven at 70° C. for 1 hour and returned to ambient temperature. The same samples were placed in a freezer at −20° C. for an hour and returned to ambient temperature.

The samples are shown in FIGS. 2 and 3.

Figure 2A:
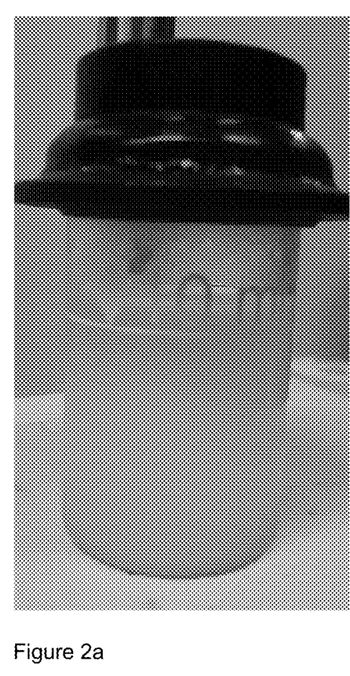
FIG. 2 shows the stability of a diesel emulsion when cooled to −20° C.
Figure 2B:
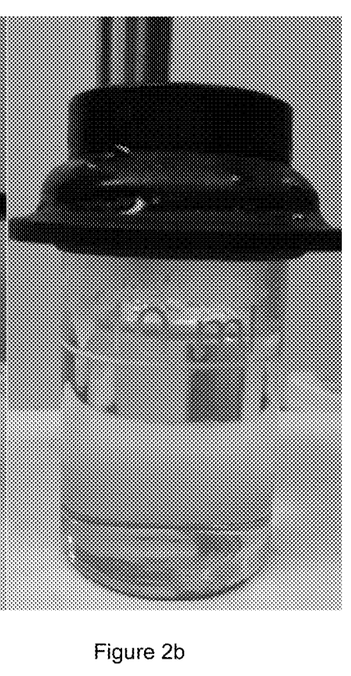

It can be seen that in FIG. 2a, at −20° C., the emulsion is turbid. However, in FIG. 2b, the emulsion is clear after returning to ambient temperature without any stirring.

Figure 3A:
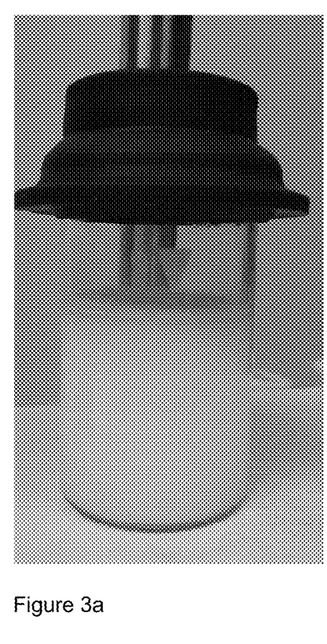
FIG. 3 shows the stability of a diesel emulsion when heated to 70° C.
Figure 3B:
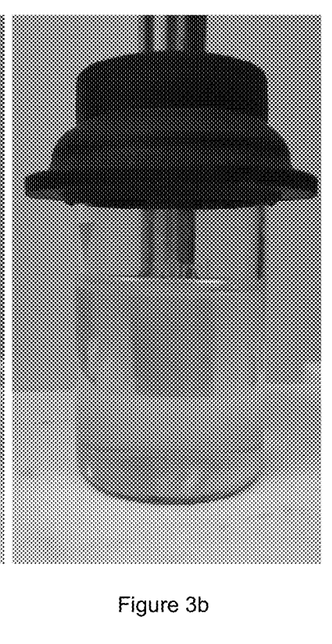

Similarly, in FIG. 3a, at 70° C., the emulsion is turbid. However, in FIG. 3b, the emulsion is clear after returning to ambient temperature without stirring.

1 part by weight of the composition of Example 7 was mixed with 30 parts by weight of water and 69 parts by weight of heavy fuel oil at 70° C. and emulsified using a U400 ultrasonicator for 3.5 minutes. The samples were then allowed to cool to ambient temperature and transferred to a container for long term storage. The container was stored at ambient temperature at an altitude of 550 m. The ambient temperature varied from 0° C. to 37° C.

Figure 4:
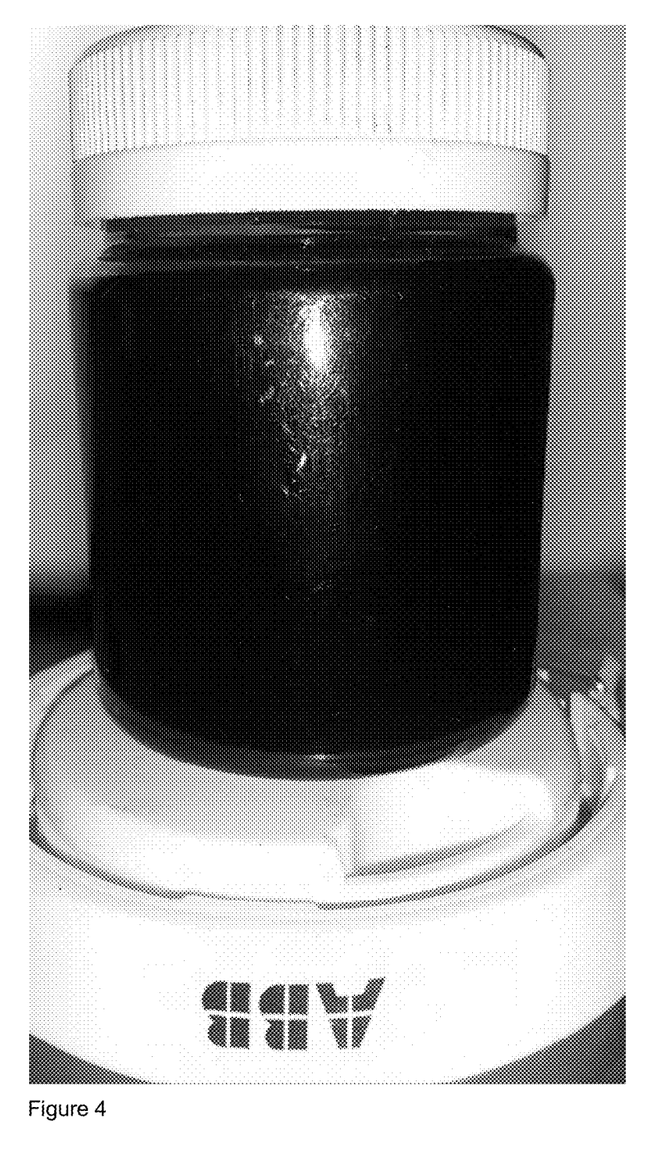
FIG. 4 shows the stability of a heavy fuel oil emulsion after 9 months.

The resulting emulsion remained stable for over 9 months. FIG. 4 shows the emulsion of the heavy fuel oil and water after 9 months.

Example 3

A scavenger solution was prepared using Composition 7. 1 part by weight of this composition was mixed with 4 parts by weight of butyl oxitol.

Testing was undertaken on Shell 500 ppm sulphur diesel in a diesel generator. The diesel generator was a 229-3 3 cylinder generator from MWM Motores Diesel Ltda.

Emissions were tested for the fuel as a baseline measurement and for the fuel containing 500 ppm of the scavenger solution.

The scavenger solution was mixed with the fuel ultrasonically using the U400 ultrasonicator. The generator was operated at a constant 1510 rpm. A 2° C. rise in block temperature was noted during the test which included the scavenger. A summary of the exhaust fumes can be seen in Table 4.

TABLE 4

| | Temp ° C. | $O_2$ % | CO ppm | $CO_2$ % | NO ppm | $NO_x$ ppm | $NO_2$ ppm | $SO_2$ ppm | $m^3/s$ | m/s |
|---|---|---|---|---|---|---|---|---|---|---|
| Shell 50 | 112.14 | 18.46 | 633.4 | 1.61 | 133.6 | 191.7 | 55.9 | 21.7 | 17.3 | 7.7 |
| Shell 50 + 500 ppm scavenger | 107.50 | 19.23 | 445.5 | 1.11 | 89 | 146.8 | 45.2 | 17.0 | 24.4 | 10.8 |

The results show a marked reduction in the amount of CO, NOx and SOx when operating with the fuel which contained the scavenger.

A test was also run on the above two fuels to measure the opacity of the exhaust gas. This measurement is related to the amount of particulate in the exhaust gas. Testing was undertaken using a Texa Diesel Smoke Opacimeter. The Opacimeter provides a qualitative and partially quantitative assessment of the amount of particulate in the exhaust gas. The baseline test gave an opacity result in the range of 1.6 to 2.3%. Testing using the fuel containing the scavenger showed a 100% reduction in the opacity i.e. showed 0% opacity.

It can be seen that addition of the scavenger reduces the all of the emissions including particulate emissions.

Example 4

The scavenger solution of Example 3 was tested in red diesel in an amount of 500 ppm. A comparison was made with red diesel without the scavenger solution.

The emissions were tested from a diesel tractor and the diesel generator used in Example 3.

The results are shown in Tables 5 and 6.

TABLE 5

| Parameter | Units | Diesel | Diesel + 500 ppm Scavenger |
|---|---|---|---|
| Total Particulate Matter | $mg/m^3$ | 45.3 | 41.5 |
| Total Particulate emission rate | g/hr | 5.3 | 4.8 |
| PM 10 | $mg/m^3$ | 12.2 | 5.7 |
| PM 10 emission rate | g/hr | 1.0 | 0.5 |
| PM 2.5 | $mg/m^3$ | 10.63 | 4.1 |
| PM 2.5 emission rate | g/hr | 0.91 | 0.4 |

TABLE 5-continued

| Parameter | Units | Diesel | Diesel + 500 ppm Scavenger |
|---|---|---|---|
| $NO_2$ | mg/m$^3$ | 655.1 | 697.1 |
| $NO_2$ emission rate | g/hr | 75.3 | 80.1 |
| $SO_2$ | mg/m$^3$ | 26.1 | 26.1 |
| $SO_2$ emission rate | g/hr | 3.0 | 3.1 |
| CO | mg/m$^3$ | 903.1 | 763.2 |
| CO emission rate | g/hr | 103.8 | 87.7 |
| $CO_2$ | % v/v | 2.13 | 2.10 |
| $O_2$ | % v/v | 17.95 | 17.98 |
| Moisture | % | 3.8 | 3.0 |
| Stack gas temperature | °C. | 113 | 113 |
| Stack gas velocity | m/s | 19.1 | 19.1 |

TABLE 6

| Parameter | Units | Diesel | Diesel + 500 ppm Scavenger |
|---|---|---|---|
| Total Particulate Matter | mg/m$^3$ | 16.9 | 14.4 |
| Total Particulate emission rate | g/hr | 4 | 3.5 |
| PM 10 | mg/m$^3$ | | |
| PM 10 emission rate | g/hr | | |
| PM 2.5 | mg/m$^3$ | | |
| PM 2.5 emission rate | g/hr | | |
| $NO_2$ | mg/m$^3$ | 397.8 | 399.2 |
| $NO_2$ emission rate | g/hr | 100.8 | 101.2 |
| $SO_2$ | mg/m$^3$ | 19.5 | 21.6 |
| $SO_2$ emission rate | g/hr | 4.9 | 5.5 |
| CO | mg/m$^3$ | 80.9 | 86 |
| CO emission rate | g/hr | 20.5 | 21.8 |
| $CO_2$ | % v/v | 2.37 | 2.3 |
| $O_2$ | % v/v | 17.79 | 17.89 |
| Moisture | % | 6.9 | 3.9 |
| Stack gas temperature | °C. | 117 | 117 |
| Stack gas velocity | m/s | 25.6 | 25.6 |

It can be seen that in both cases, there is a reduction in the total level of particulate matter produced with the addition of the additive.

Example 5

Composition 7 was mixed with water and heavy fuel oil in the amounts set out in Table 7. The mixture was emulsified using a UIP1000 bench top ultrasonicator from Hielscher.

Table 7 sets out the power required to produce a stable emulsion.

TABLE 7

| HFO (g) | Composition 7 (g) | Water (g) | Power (Ws/g) |
|---|---|---|---|
| 80 | 1 | 5 | 31.4 |
| 80 | 1 | 9 | 42.8 |
| 80 | 1 | 18 | 61.3 |
| 80 | 2 | 18 | 8.0 |

It can be seen from Table 7 that it is possible to produce a stable emulsion in all cases. However, when an emulsion is produced using 2% of Composition 7 in combination with 18% of water, it is possible to produce an emulsion at significantly lower levels of power. This low level of power is particularly useful as the cost for producing the emulsion is relatively low. Given the energy saving and reduction in emissions identified above when using water/heavy fuel oil emulsions, it can be seen that the present invention provides a commercially beneficial method and emulsion.

It is expected that this process will enable higher levels of water to be emulsified whilst requiring a low amount of power. The skilled person is capable of refining the specific amounts of the composition and the water.

In this specification, unless expressly otherwise indicated, the word 'or' is used in the sense of an operator that returns a true value when either or both of the stated conditions is met, as opposed to the operator 'exclusive or' which requires that only one of the conditions is met. The word 'comprising' is used in the sense of 'including' rather than in to mean 'consisting of'. All prior teachings acknowledged above are hereby incorporated by reference. No acknowledgement of any prior published document herein should be taken to be an admission or representation that the teaching thereof was common general knowledge in Australia or elsewhere at the date hereof.

The invention claimed is:

1. A composition comprising:
   60-90 wt % of at least one $C_8$ to $C_{18}$ fatty acid diethanolamide;
   2-10 wt % of at least one $C_{12}$ to $C_{24}$ fatty acid; and
   5-20 wt % of at least one $C_6$ to $C_{18}$ alcohol ethoxylate;
   wherein said emulsifier does not comprise naphtha; and
   wherein the composition is useful as an emulsifier.

2. A composition according to claim 1 comprising:
   a fuel comprising at least one of diesel, low sulphur diesel, biodiesel and heavy fuel oil;
   less than or equal to 30 wt % water; and
   from 0.5 to 15 wt % of the emulsifier.

3. A composition according to claim 1 comprising:
   a fuel comprising at least one of diesel, low sulphur diesel and heavy fuel oil, wherein the fuel does not contain any bio-components;
   less than or equal to 20 wt % water; and
   the emulsifier,
   wherein the emulsifier:water volume ratio is from 1.5:1 to 1:2.9, and
   wherein the composition is a nanemulsion.

4. A method of making a nanoemulsion according to claim 3, comprising emulsifying a mixture of the fuel, water and the emulsifier using ultrasonic emulsification.

5. The composition as claimed in claim 1, wherein the fatty acid ethanolamide is derived from a natural source.

6. The composition as claimed in claim 1, wherein the fatty acid is a monounsaturated fatty acid and preferably a $C_{14-20}$ monounsaturated fatty acid.

7. The composition as claimed in claim 1, wherein the alcohol ethoxylate has a HLB in the range of from 9 to 12.

8. A scavenger solution comprising:
   10-40 wt % composition of claim 1; and
   60-90 wt % alkylene glycol monoalkyl ether.

9. The composition of claim 1 comprising 10-30 wt % of at least one sorbitan ester.

* * * * *